(12) United States Patent
Sung

(10) Patent No.: US 7,448,588 B2
(45) Date of Patent: Nov. 11, 2008

(54) SUPPORTING DEVICE USED FOR SUSTAINING AN APPARATUS WITHIN A PORTABLE COMPUTER

(75) Inventor: Chien-Ming Sung, Taipei Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 346 days.

(21) Appl. No.: 11/207,945

(22) Filed: Aug. 22, 2005

(65) Prior Publication Data

US 2006/0237623 A1   Oct. 26, 2006

(30) Foreign Application Priority Data

Apr. 20, 2005   (TW) ............................... 94112617 A

(51) Int. Cl.
*A47F 5/00*    (2006.01)
*E04G 25/00*   (2006.01)
*F16M 13/00*   (2006.01)

(52) U.S. Cl. ............... 248/351; 248/188.8; 248/188.91; 248/151; 248/454; 248/455; 248/917; 16/324; 16/326; 361/681; 361/682

(58) Field of Classification Search ................. 248/351, 248/188.8, 188.91, 151, 917, 454.455; 16/324, 16/326; 361/681, 682

See application file for complete search history.

(56) References Cited

U.S. PATENT DOCUMENTS

| 5,662,296 | A  | * | 9/1997  | Wu ............................. 248/96 |
| 5,964,545 | A  | * | 10/1999 | Cheng ........................ 403/102 |
| 5,988,928 | A  | * | 11/1999 | Cheng ........................ 403/102 |
| 6,711,760 | B1 | * | 3/2004  | Yang ........................... 5/99.1 |
| 7,021,600 | B2 | * | 4/2006  | Yang ........................ 248/688 |
| 7,111,361 | B2 | * | 9/2006  | Li et al. ........................ 16/284 |
| 7,150,072 | B2 | * | 12/2006 | Huang et al. .................. 16/312 |

* cited by examiner

*Primary Examiner*—J. Allen Shriver
*Assistant Examiner*—Nkeisha J Dumas
(74) *Attorney, Agent, or Firm*—Rabin & Berdo, PC

(57) ABSTRACT

A supporting device is described. The supporting device includes a shell, a release mechanism, a rotational mechanism, and a support frame. The shell includes a release chamber disposed at the central position of the shell and a rotational chamber through the shell and perpendicular to the release chamber. The release mechanism is disposed in the release chamber for operating the support frame. The rotational mechanism is disposed in the rotational chamber and protrudes to move correlatively with the release mechanism. The support frame is coupled to the rotational mechanism and is unfolded outwardly for supporting an apparatus. The support frame is closed into the equipment by operating the release mechanism.

12 Claims, 8 Drawing Sheets

SUPPORTING DEVICE USED FOR SUSTAINING AN APPARATUS WITHIN A PORTABLE COMPUTER

RELATED APPLICATIONS

The present application is based on, and claims priority from, Taiwan Application Serial Number 94112617, filed Apr. 20, 2005, the disclosure of which is hereby incorporated by reference herein in its entirety.

FIELD OF THE INVENTION

The present invention relates to a supporting device, and more particularly to a foldable supporting device for a portable electronic apparatus.

BACKGROUND OF THE INVENTION

A supporting device is generally used for supporting an apparatus, such as a flat panel display, to provide a function for adjusting the visual angle between the user and the display. The types of the supporting device coupling with the display may typically be classified as fixed module and detachable module. The fixed module is immovably fastened to the display, except for a movable portion allowing for adjusting the visual angle. Generally, it is very difficult to change the size or features of a fixed module for transport or storage, and the module is easily damaged by a crash occurring during the movement.

The detachable module can be coupled with the display during operation and can be detached easily from the display allowing for more convenient transport and storage. However, there are several drawbacks to the conventional detachable modules. For example, tools may be required to detach a supporting device for transport. The parts disassembled from the supporting device could be lost, rendering the supporting device useless.

It is desirable, therefore, to provide a supporting device that can change in size or features but does not need to be detached from the supported apparatus for transport or storage.

SUMMARY OF THE INVENTION

The object of the present invention is to provide a supporting device that can be unfolded for supporting an apparatus and can be folded for transport or storage.

Another object of the present invention is to provide a supporting device that can be operated easily by unfolding and folding a supporting frame without using any additional tools.

In accordance with the objects of the present invention, a supporting device is provided, wherein the supporting device comprises a shell with a through-hole, a release mechanism, a rotational mechanism, and a support frame. A release chamber and a rotational chamber are defined by the sidewalls of the shell, wherein the release chamber is located at the central position of the shell, and the rotational chamber is perpendicular to the release chamber. The release mechanism is disposed in the release chamber for operating the support frame. The rotational mechanism is disposed in the rotational chamber and protrudes from the shell via the through-hole, wherein the rotational mechanism is droved correlatively by the release mechanism. The support frame may be coupled to the rotational mechanism and is unfolded outwardly for supporting an apparatus. Conversely, the support frame is moved toward the apparatus by operating the release mechanism for transport or storage.

The frame is coupled with a first coupling portion on a suitable location of the shell. There are two caps engaged with the openings of the through-hole. Each of the caps has a penetrated hole allowing the rotational mechanism to protrude out.

The release mechanism comprises a plate element, a spring element, and a release button. The plate element having a directing recess can slip within the release mechanism, wherein the directing recess can be separated into a circular recess and an arc recess with the same diameter. The chord of the arc recess is parallel to the slipping direction of the plate element within the release chamber. The spring element is located between the shell and the plate element to provide a force for returning the plate element to its native place. The release button is located on the plate element for operating the release mechanism.

The rotational mechanism comprises a pivot portion, a rotational axle, two torsional elements, and two means for fastening. Since the rotational mechanism is a symmetrical assembly of the aforementioned elements, for clear understanding, the specification describes just one half of the rotational mechanism. The pivot portion that has a cross-section shaped like the arc recess is deposited in the rotational chamber. The pivot portion has a pair of engaging portions symmetrically protruding from its two ends, wherein the axle of the two engaging portions penetrates through the center of the pivot portion, and the cross-section of the pair of engaging portions is circular. The rotational axle has two symmetrical shafts that are connected by the pivot element there between. Each shaft is coaxially coupled with the pivot portion, and the other end is coupled with the frame. Each of the torsional elements is assembled between the shell and one of the shafts, providing a torsional stress. One of the two means for fastening is located on an interface between one of the caps and the portion of one of the shafts protruding out of the shell, wherein the means for fastening has another function to restrict the movement of the rotational mechanism rotating with the rotational axle within certain limits.

Each shaft includes a mounted portion, a first socket, a fastening groove and a frame-coupling portion. The mounted portion located on one end of the shaft connects with the engaging portion of the pivot element. The first socket located on the shaft deviated from the axle thereof is used for engaging with one of the torsional elements. The frame-coupling portion located on the other end of the shaft is used for connecting with the first coupling portion of the frame. The fastening groove located on the surface of the shaft between the mounted portion and the frame-coupling portion is provided for fastening or engaging with.

In addition, means for insurance are applied between the through-holes and the corresponding caps to prevent the caps from rotating with the rotational mechanism. The other end of the torsional element aforementioned may be engaged with a second socket located on the corresponding cap.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The foregoing aspects and many of the attendant advantages of this invention will become more readily appreciated, as the same becomes better understood by reference to the following detailed description of preferred embodiments. The preferred embodiments of the present invention are illustrated of the present invention rather than limiting of the present invention. Various modifications and similar arrangements derived from the present embodiments by persons skilled in the art may be included within the spirit and scope of the invention.

The description is intended to be read in connection with the accompanying figures. In the description, relative terms such as "lower", "upper", "horizontal", "above", "below", "up", "down", "top" and "bottom", as well as derivatives thereof, should be construed to refer to the orientation as described in the figures.

Figure 1:
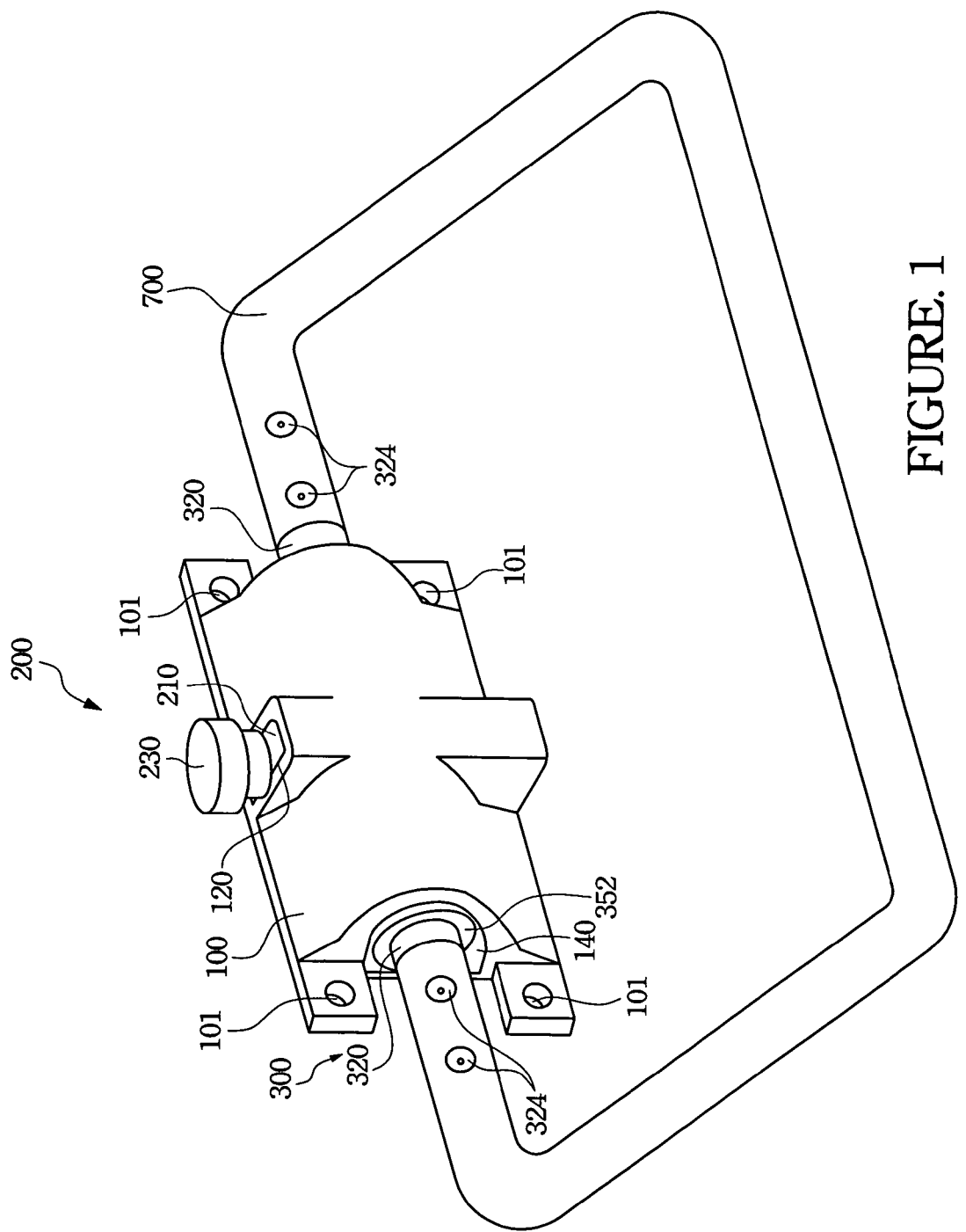
FIG. 1 illustrates the elevation of the supporting device in accordance with a preferred embodiment of the present invention.
Figure 2:
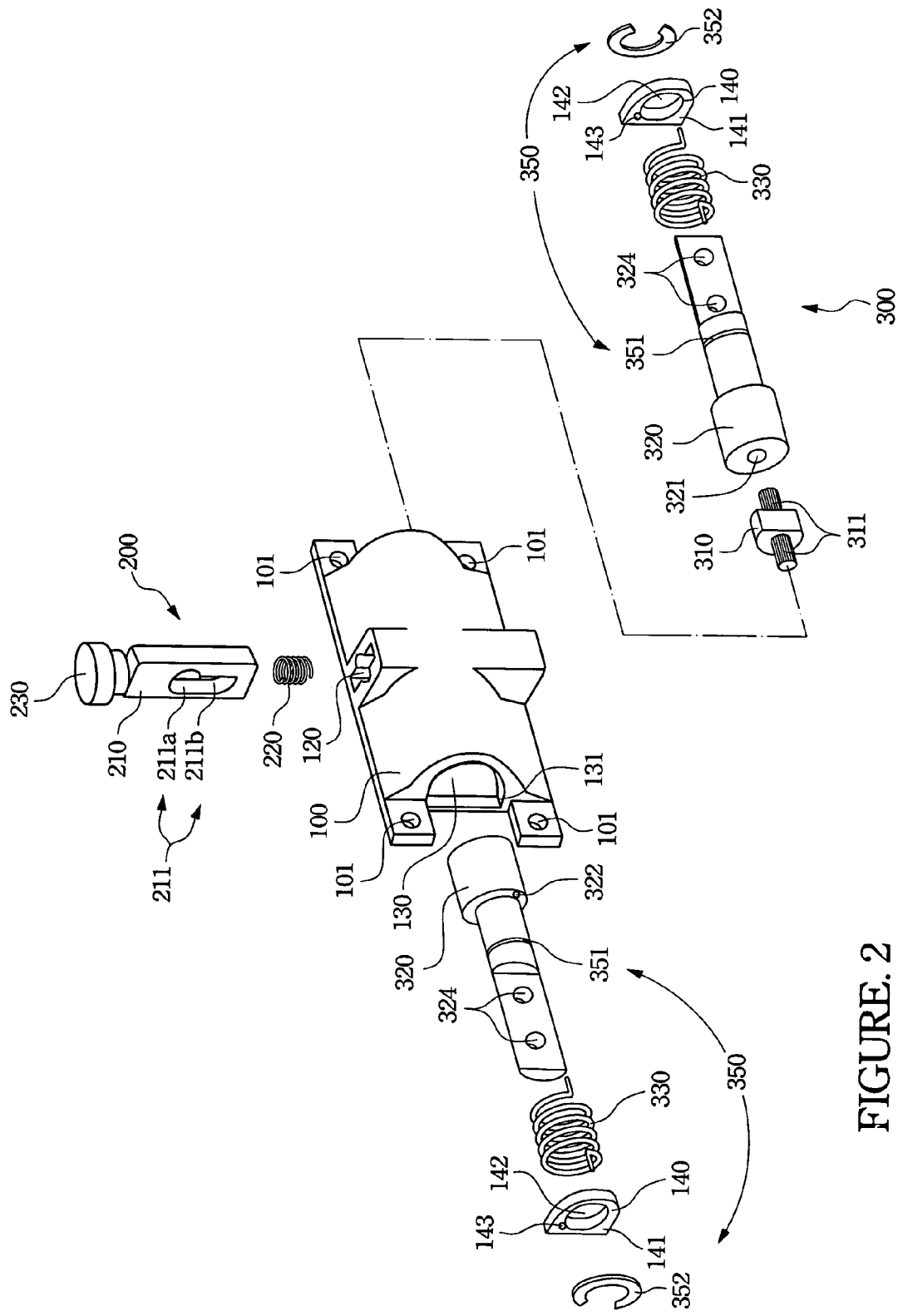
FIG. 2 illustrates the exploded view of the supporting device in accordance with a preferred embodiment of the present invention.

Referring to FIGS. 1 and 2, the supporting device of the present invention comprises a shell 100 with a through-hole, a release mechanism 200, a rotational mechanism 300, and a support frame 700. The supporting device is used to support an apparatus (such as a flat panel display) that couples with a connecting portion 101 located on any appropriate location of the shell 100. A release chamber 120 and a rotational chamber 130 defined by the sidewalls of the shell 100 can be integrated as a bulk chamber, wherein the release chamber 120 is located at the central position of the shell 100, and the rotational chamber 130 is perpendicular to the release chamber 120. The release mechanism 200 is disposed in the release chamber 120 for operating the support frame. The rotational mechanism 300 is configured in the rotational chamber 130 and protrudes from the shell 100 via the through-hole.

The shell 100 further comprises two caps 140 sized for being engaged within the openings of the through-holes. Each of the caps 140 has a penetrated hole 142 allowing the rotational mechanism 300 to protrude out. Means for insurance 131 and 141 are applied between the through-holes and the corresponding caps 140 to prevent the caps 140 from rotating with the rotational mechanism 300. In addition, each of the caps has a first socket located around the penetrated hole 142.

The release mechanism 200 comprises a spring element 220 and a plate element 210 that are sequentially configured into the release chamber 120. The plate element 210 has a directing recess 211 that can slip in the release mechanism, wherein the directing recess 211 can be defined by a circular recess 211a and an arc recess 211b with the same diameter. The chord of the arc recess 211b is parallel to the slipping direction of the plate element 210 within the release chamber 120. The spring element 220 is located between the shell 100 and the plate element 210 to provide a force for returning the plate element 210 to its native place. The release mechanism 200 further comprises a release button 230 located on the top of the plate element 210 used for operating the release mechanism 200.

The rotational mechanism 300 located in the rotational chamber 130 comprises a pivot portion 310, a rotational axle 320, two torsional elements 330, and two means for fastening 350 that are arranged sequentially from the center of the rotational chamber 130.

Since the rotational mechanism is a symmetrical assembly of the aforementioned elements, for clearer understanding, the specification describes only one half of the rotational mechanism in detail.

The pivot portion 310 that has a cross-section shaped like the arc recess 211b is deposited in the directing recess 211 within the rotational chamber 130. The pivot portion 310 has a pair of engaging portions 311 symmetrically protruding from two ends of the pivot portion 310, wherein the axle of the pair of engaging portions 311 penetrates through the center of the pivot portion 310, and the cross-section of the two engaging portions 311 is circular.

As the pivot portion 310 is engaged by the arc recess 211b, the pivot portion 310 can merely slip along the axis of the directing recess 211 (also the axis of the rotational chamber 130). When the pivot portion 310 is moved into the circular recess 211a, the pivot portion 310 can rotate freely within the circular recess 211a and along the axle of the circular recess 211a.

The rotational axle 320 comprises a pair of torsional elements 330, two means for fastening 350 and a pair of symmetrical shafts, wherein each shaft has a mounted portion 321, a first socket 322, a fastening groove 351 and a frame-coupling portion 324. The shafts are connected with each other by the pivot element 310. Each shaft having a mounted portion 321 located on one end of the shaft coaxially couples with the engaging portions 311, such that the rotational axle 320 and the pivot portion 310 can rotate coaxially. The first socket 322 located on the shaft deviates from the axle thereof. The frame-coupling portion 324 located on the other end of the shaft is coupled with the frame 700. The fastening groove 351 located on the surface of the shaft between the mounted portion 321 and the frame-coupling portion 324 is assembled between the shell 100 and the rotational axle 320. One end of one of the torsional elements 330 engages with the first socket 322 of the rotational axle 320. The other end the torsional element 330 engages with a second socket 143 located on the corresponding cap 140. Two means for insurance 131 and 141 are applied between the through-holes and the corresponding caps 140, wherein the torsional elements 330 assembled between the caps 140 and the rotational axle 320 may provide a torsional stress to prevent the caps 140 from rotating with the rotational axle 320.

One of the two means for fastening 350 is located on an interface between one of the caps 140 and the portion of one of the shafts protruding out of the shell 100, wherein the two means for fastening 350 are made of C-shaped bolts 352, and each of the two bolts 352 engages with the corresponding fastening groove 351. When the rotational mechanism 300 is configured in the rotational chamber 130, the through-holes may be sealed with the caps 140, and then each of the two bolts 352 engages with the corresponding fastening groove 351 to prevent the lateral movement of the rotational mechanism 300 along the axle of the rotational chamber 130.

Figure 3A:
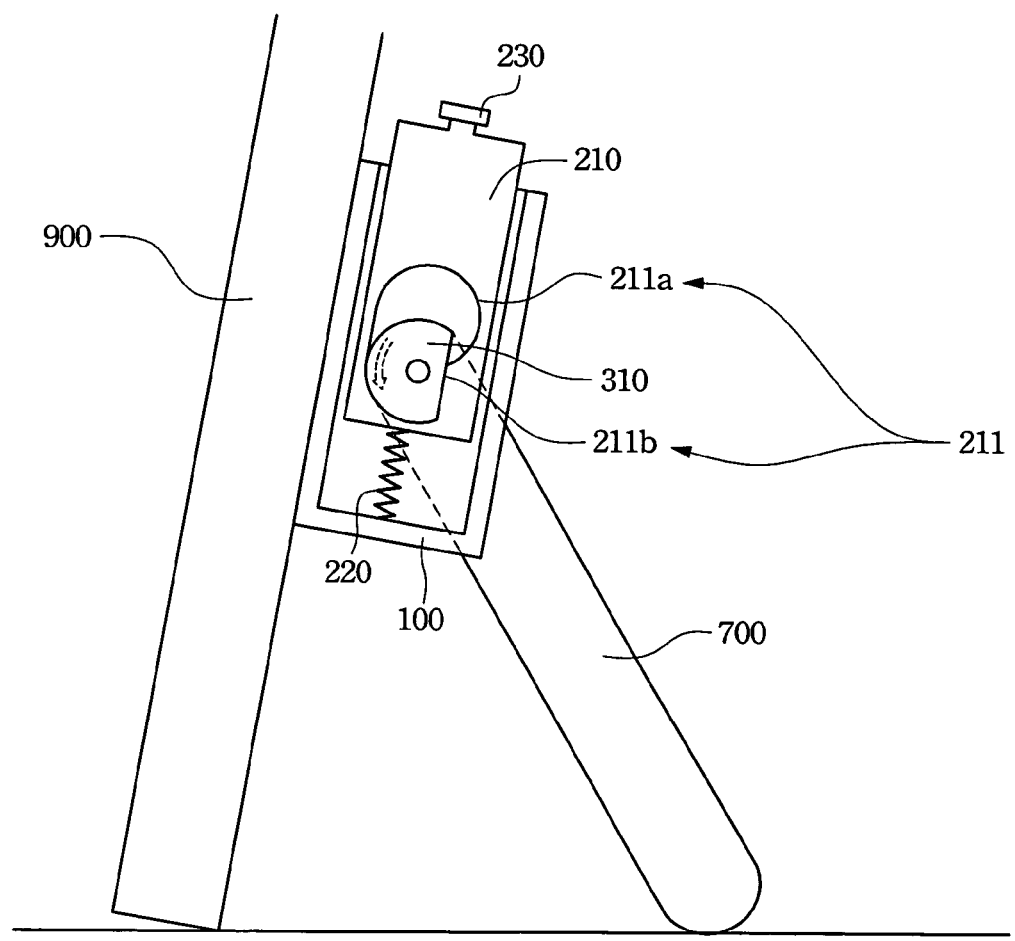
FIG. 3A to FIG. 3C illustrate the cross-sectional view of operation steps for folding a supporting device in accordance with a preferred embodiment of the present invention.
Figure 3B:
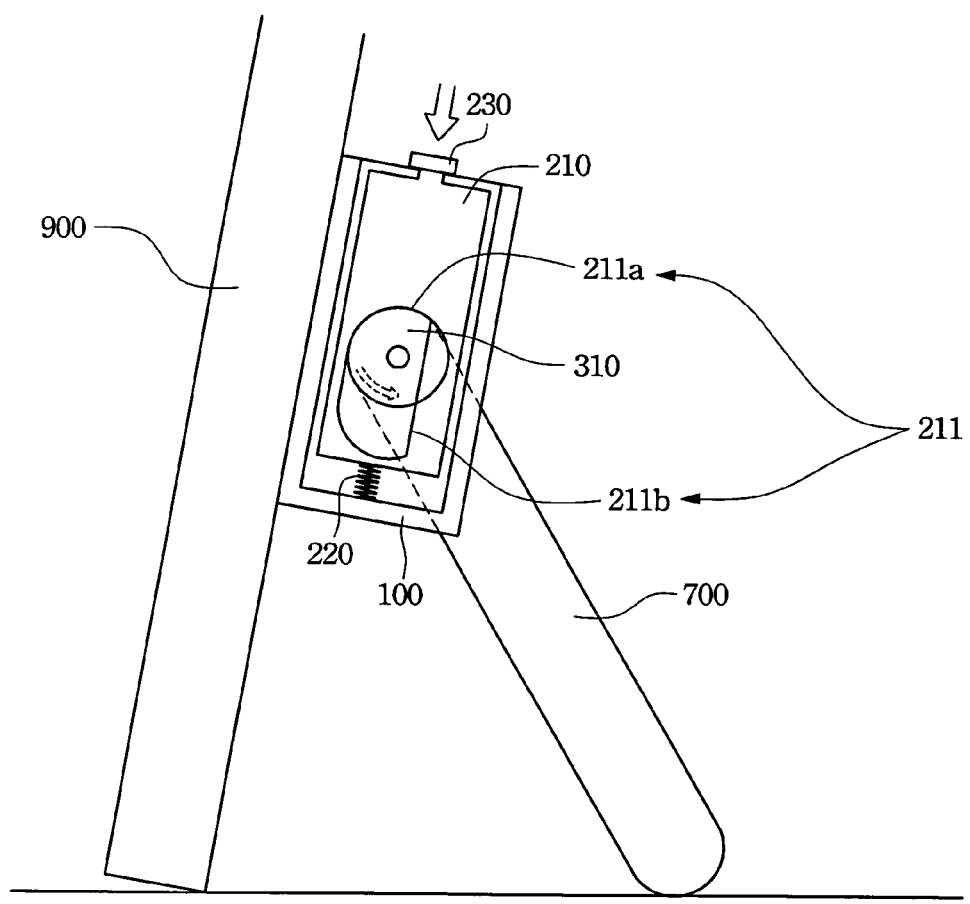
Figure 3C:
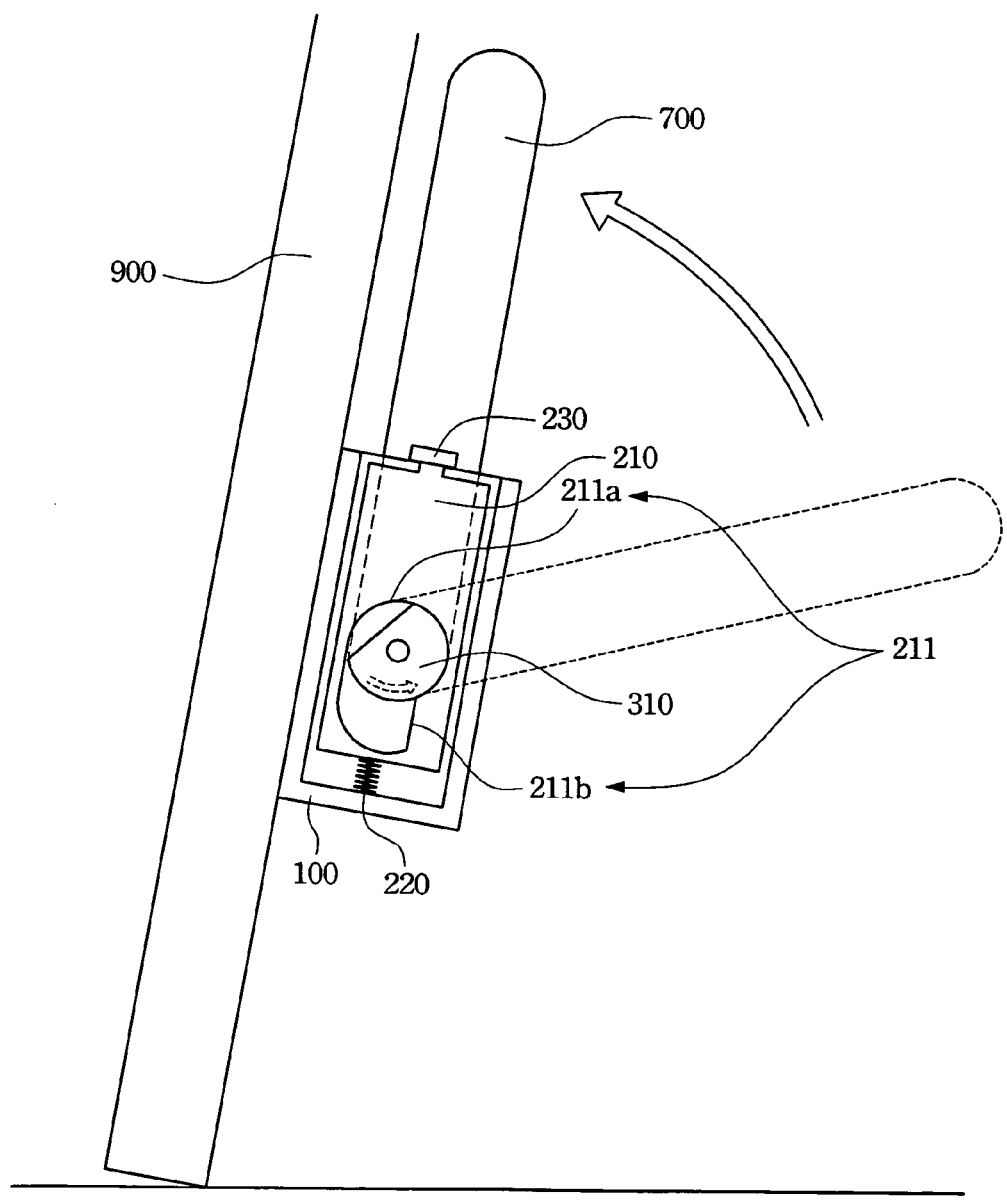

FIGS. 3A to 3C illustrate the folding mechanism of present supporting device in detail.

Referring to FIG. 3A, the frame 700 engages with the frame-coupling portions 324 located on the pair of shafts with a specific included angle. When the fame 700 is unfolded for supporting a display 900, the release mechanism 200 and the rotational mechanism 300 engage in the state as illustrated in FIG. 3A, wherein the plate element 210 engaged by the pivot portion 310 is thrust upward by the spring element 220. Thus, the pivot portion 310 can be located in the arc recess 211b of the directing recess 211 to limit the rotation of the pivot portion 310 in the frame 700 and to limit the plate element 210 from slipping out of the release mechanism 120. At the same time, the torsional elements 330 are touched and a potential torsional stress is generated therein.

Referring to FIG. 3B, when the frame 700 is folded for transport or storage, the plate element 210 is forced downward by pushing the release button 230 to compress the spring element 220, such that the pivot portion 310 is located in the circular recess 211a of the directing recess 211 as the plate element 210 slips and can rotate freely.

Referring to FIG. 3C, the frame 700 can be located adjacent to the display 900 by rotating on the rotational axle 320 due to the potential torsional stress generated by the torsional elements 330. At such a state, the compressed spring element 220 cannot thrust the plate element 210 to slip upward to unfold the frame 700 because the chord of the pivot portion 310 is not aligned with the chord of the arc recess 210b for allowing the pivot portion to slip within, even though the release button 230 has been released.

Figure 4A:
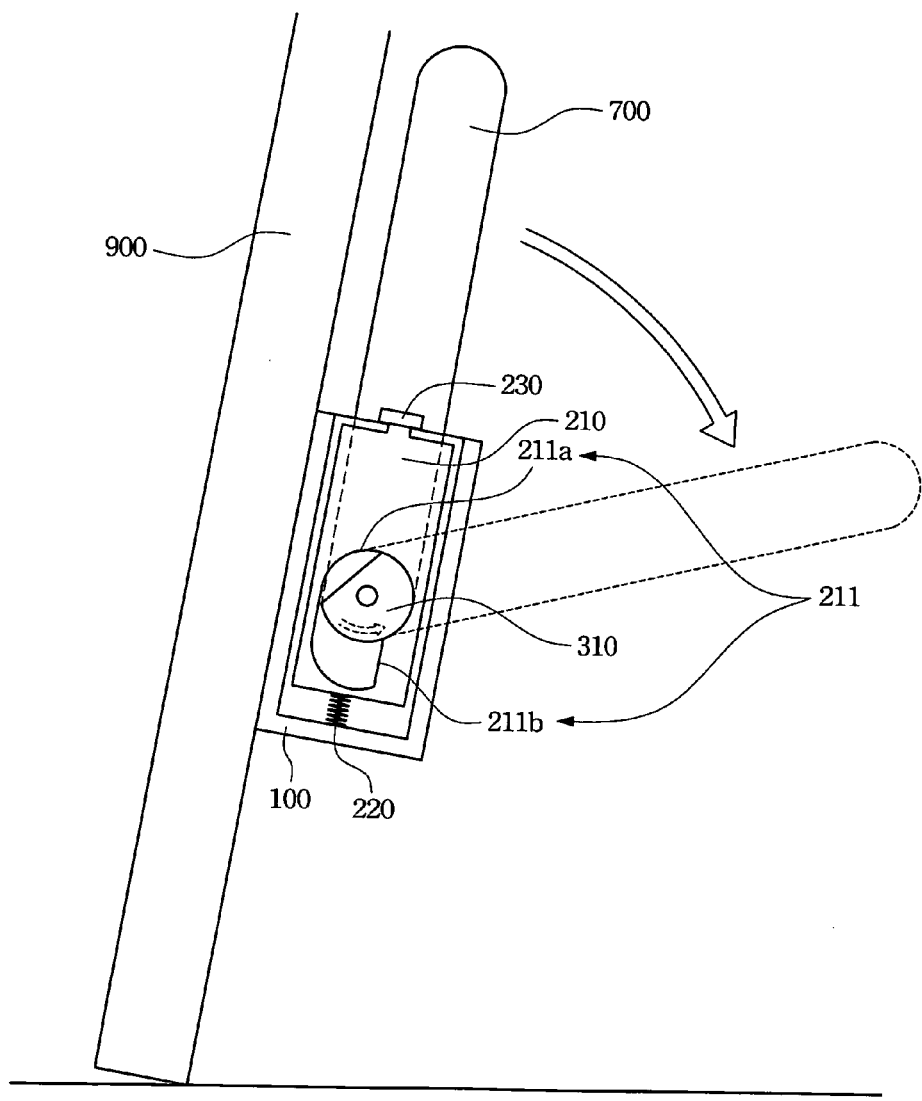
FIG. 4A to FIG. 4C illustrate the cross-sectional view of operation steps for unfolding a supporting device in accordance with a preferred embodiment of the present invention.
Figure 4B:
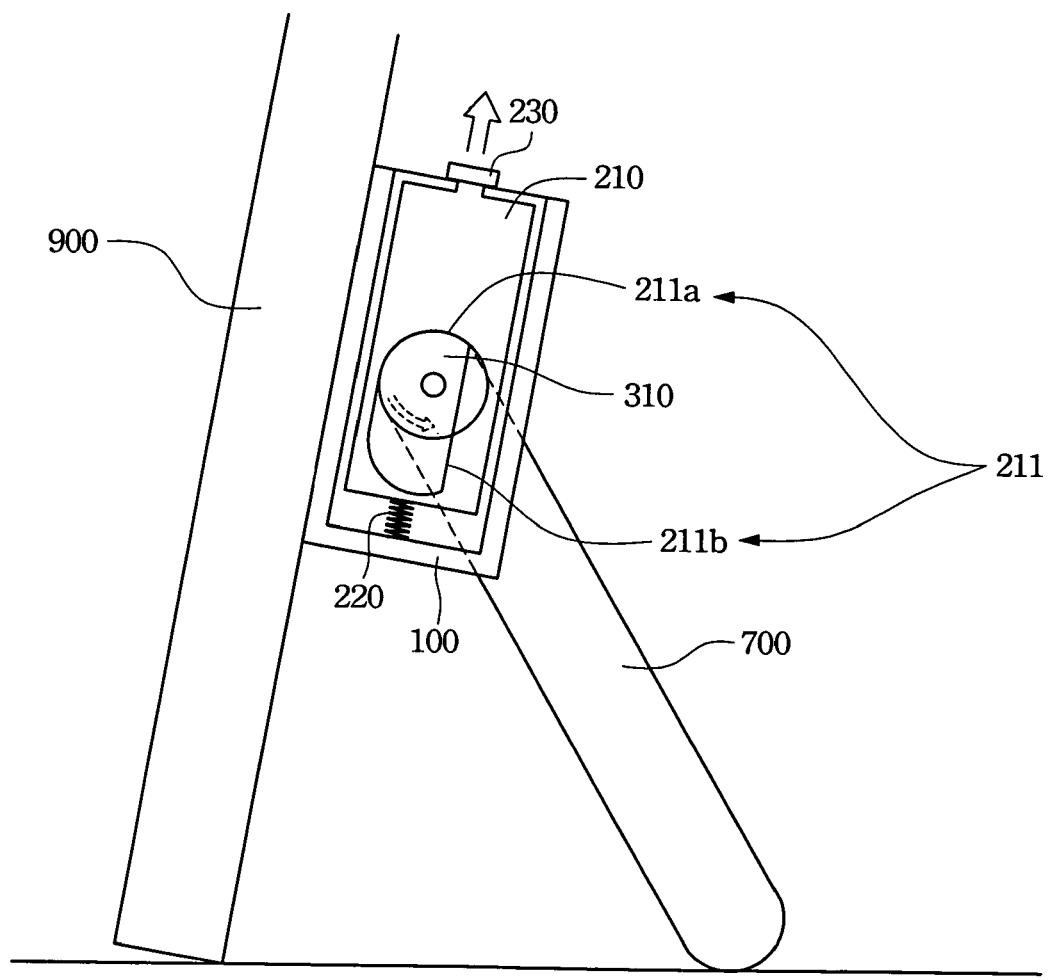
Figure 4C:
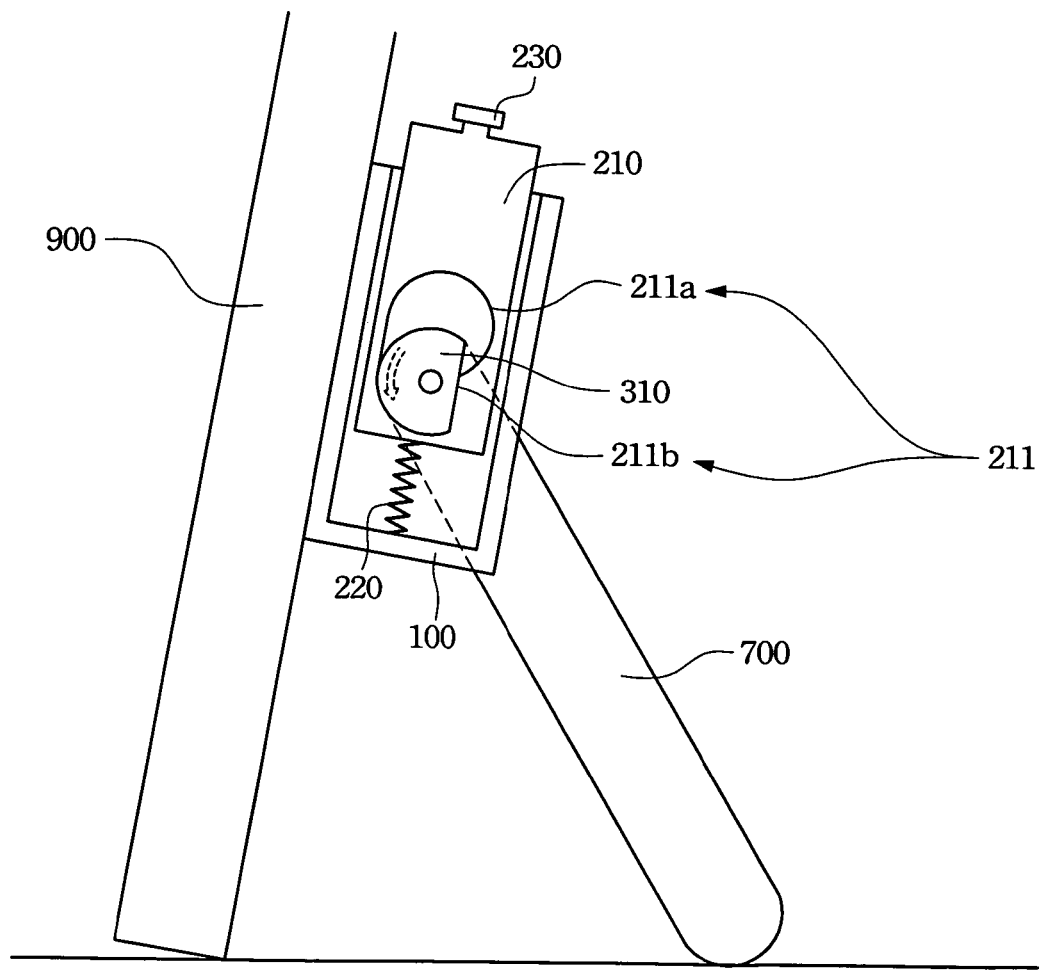

FIGS. 4A to 4C illustrate the unfolding mechanism of present supporting device in detail.

Referring to FIG. 4A, the supporting device can be unfolded merely by rotating the frame 700. The torsional elements 330 located between the rotational axle 320 and the caps 140 are touched and a potential torsional stress is generated therein due to the rotation.

Referring to FIG. 4B, during the rotation, the potential energy of the compressed spring element 220 can be released to thrust the plate element 210 upward as the chord of the pivot portion 310 is aligned with the chord of the arc recess 210b for allowing the pivot portion to slip within and thus restrain the rotation of the pivot portion 310.

Referring to FIG. 4C, when the plate element 210 is thrust upward for allowing the pivot portion to engage with the arc recess 211b, the plate element 210 cannot be thrust upward further because of the restraint of the pivot portion 310. The frame 700 is unfolded for sustaining the display 900 as the arc recess 211B and the pivot portion engage. The potential torsional stress of the torsional elements 330 is generated for the rotational mechanism 300 to fold the supporting device.

The preferred embodiment has been illustrated in detail as an example comprising a frame 700 and a rotational mechanism 300 having two shafts. The quantities of the shafts and frames used in present embodiments are not limited. The included angle between the frame 700 and the rotational axle 320 is also not limited. For example, a rotational mechanism comprising a single shaft can also be used to meet the objectives of the present invention. The included angle can be adjusted depending upon the actual weight of the apparatus sustained by the frame 700. The potential torsional stress of the torsional elements 330 are not limited to fold the frame 700 clockwise; the frame 700 may be folded anti-clockwise adjacent to the flat panel display. In addition, the means for the fastener is not limited to a C-shaped bolt; any means for restraining the movement of the rotational mechanism along the axle of the rotational chamber may be used as the means for the fastener. In the foregoing preferred embodiment, the torsional element 330 is described as a spring assembled between the rotational axle and the caps 140, but anything that can provide a torsional stress to the torsional elements 330 may be used. For example, in another embodiment of the present invention, the torsional elements 330 may be a spring located between the rotational axle and the shell 100.

In accordance with the preferred embodiments of present invention, advantages include: 1) a supporting device fastened on a sustained apparatus may be provided in which the supporting device is foldable for transport and storage; and 2) the supporting device can be folded or unfolded by simple operational steps without the use of any tools.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A supporting device used for sustaining an apparatus within a portable computer, comprising:
    a shell comprising a rotational chamber and a release chamber both identified by sidewalls of the shell, wherein the release chamber is located in the shell and the rotational chamber penetrates the shell and perpendicularly penetrates the release chamber;
    a release mechanism located in the release chamber, which is used for operating the supporting device;
    a rotational mechanism located in the rotational chamber, wherein the rotational mechanism protrudes from the rotational chamber and moves correlatively with the release mechanism; and
    a frame coupling with the rotational mechanism, wherein when the frame is used for sustaining the apparatus, the frame is unfolded and when the frame is folded, the rotational mechanism is rotated to fold the frame adjacent to the apparatus,
    wherein the shell further comprises at least one opening defined by the rotational chamber, and at least one cap located on the opening of the rotational chamber, wherein the cap has a through-hole allowing the rotational mechanism to protrude through the rotational chamber via the through-hole.

2. The supporting device according to claim 1, wherein the shell further comprises a connecting portion that is located on any appropriate location of the shell and is used for coupling with the apparatus.

3. The supporting device according to claim 1, wherein the release mechanism comprises:
    a plate element having a directing recess that can slip in the release chamber, wherein the directing recess includes a circular recess and an arc recess with the same diameter, and a chord of the arc recess is parallel to a slipping direction of the plate element within the release chamber; and
    a spring element located between the shell and the plate element to provide a force for returning the plate element to its native place.

4. The supporting device according to claim 3, wherein the release mechanism further comprises a release button located on the plate element used for operating the release mechanism.

5. The supporting device according to claim 1,
    wherein the release mechanism comprises a plate element having a directing recess that is slidable in the release chamber, wherein the directing recess includes a circular recess and an arc recess, and
    wherein the rotational mechanism comprises:
    a pivot portion, located in the directing recess within the rotational chamber, wherein the pivot portion has a cross-section shaped like the arc recess and has circular shaped engaging portions symmetrically protruding from the pivot portion, wherein an axle of the pair of engaging portions penetrates through a center of the pivot portion;

a rotational axle having a shaft, wherein one end of the shaft coaxially couples with one of the pair of engaging portions, and the other end couples with the frame; and a torsional element assembled between the shell and the rotational axle providing a torsional stress there between.

6. The supporting device according to claim 5, wherein the rotational axle further comprises:

a mounted portion located on one end of the shaft and coupling with the engaging portion of the pivot portion;

a first socket located on the shaft deviated from the axle of the shaft, used for engaging with one end of the torsional element; and a frame-coupling portion located on the other end of the shaft coupling with the frame.

7. The supporting device according to claim 5, wherein the rotational axle further comprises a means for fastening located on an interface between the shell and the rotational axle, used for restraining the movement of the rotational mechanism along the axle of the rotational chamber.

8. The supporting device according to claim 7, wherein the means for fastening comprises a C-shaped bolt, used for engaging with a fastening groove located on a surface of the shaft.

9. The supporting device according to claim 5, wherein the rotational mechanism further comprises a preventing means for preventing the cap from rotating with the rotational mechanism, the preventing means being located between the opening of the rotational chamber and the cap.

10. The supporting device according to claim 9, wherein the cap comprises a second socket that engages with the torsional element.

11. A supporting device used for sustaining an apparatus within a portable computer, comprising:

a shell comprising a release chamber located in the shell, and a rotational chamber penetrating the shell, wherein the rotational chamber perpendicularly penetrates the release chamber;

a release mechanism located in the release chamber, that is used for operating the supporting device;

a rotational mechanism located in the rotational chamber, wherein the rotational mechanism protrudes from the rotational chamber and moves correlatively with the release mechanism; and a frame coupling with the rotational mechanism, wherein when the frame is used for sustaining the apparatus, the frame is unfolded and when the frame is folded, the rotational mechanism is rotated to fold the frame adjacent to the apparatus, wherein the release mechanism includes:

a plate element having a directing recess that can slip in the release chamber, wherein the directing recess can be defined by a circular recess and an arc recess with the same diameter, and a chord of the arc recess is parallel to a slipping direction of the plate element; and a spring element located between the shell and the plate element to provide a force for returning the plate element to its native place.

12. A supporting device used for sustaining an apparatus within a portable computer, comprising:

a shell comprising a release chamber located in the shell, and a rotational chamber penetrating the shell, wherein the rotational chamber perpendicularly penetrates the release chamber;

a release mechanism located in the release chamber, that is used for operating the supporting device;

a rotational mechanism located in the rotational chamber, wherein the rotational mechanism protrudes from the rotational chamber and moves correlatively with the release mechanism; and a frame coupling with the rotational mechanism, wherein when the frame is used for sustaining the apparatus, the frame is unfolded and when the frame is folded, the rotational mechanism is rotated to fold the frame adjacent to the apparatus, wherein the release mechanism has a directing recess defined by a circular recess and an arc recess, and wherein the rotational mechanism includes:

a pivot portion located in the directing recess within the rotational chamber, wherein the pivot portion has a cross-section shaped like the arc recess and has circular shaped engaging portions symmetrically protruding from the pivot portion, wherein an axle of the pair of engaging portions penetrates through a center of the pivot portion;

a rotational axle having a shaft, wherein one end of the shaft coaxially connects with the pivot portion, and the other end couples with the frame; and torsional elements assembled between the shell and the rotational axle providing a torsional stress there between.

* * * * *